April 2, 1968     L. E. SCAGGS ETAL     3,376,500
DIRECT READING MAGNETIC FIELD INTENSITY INDICATING APPARATUS
Original Filed Dec. 5, 1963     3 Sheets-Sheet 1
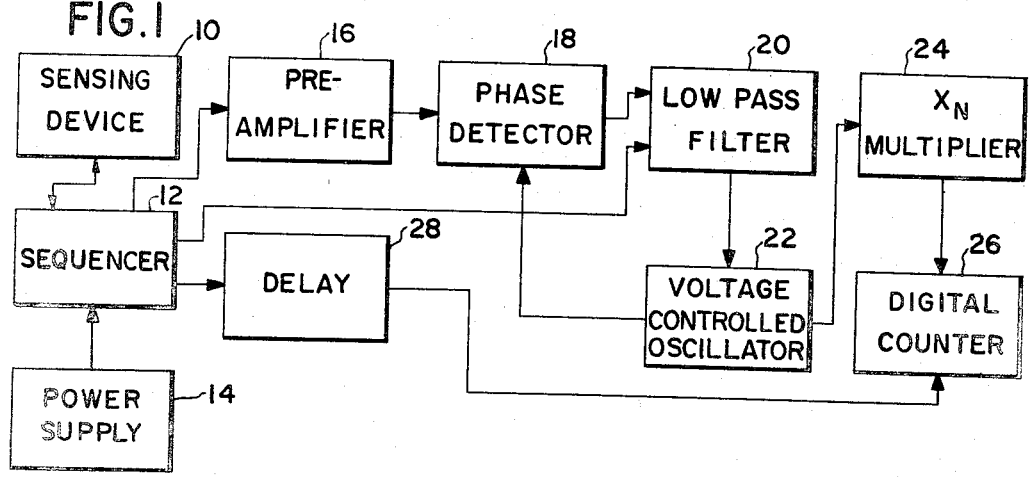
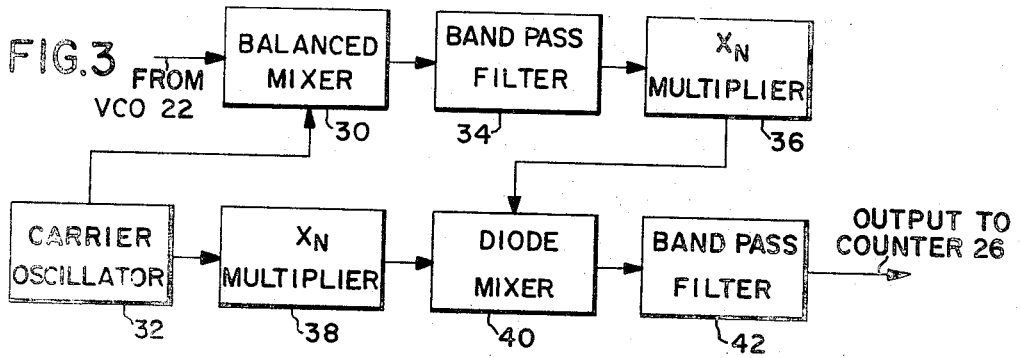
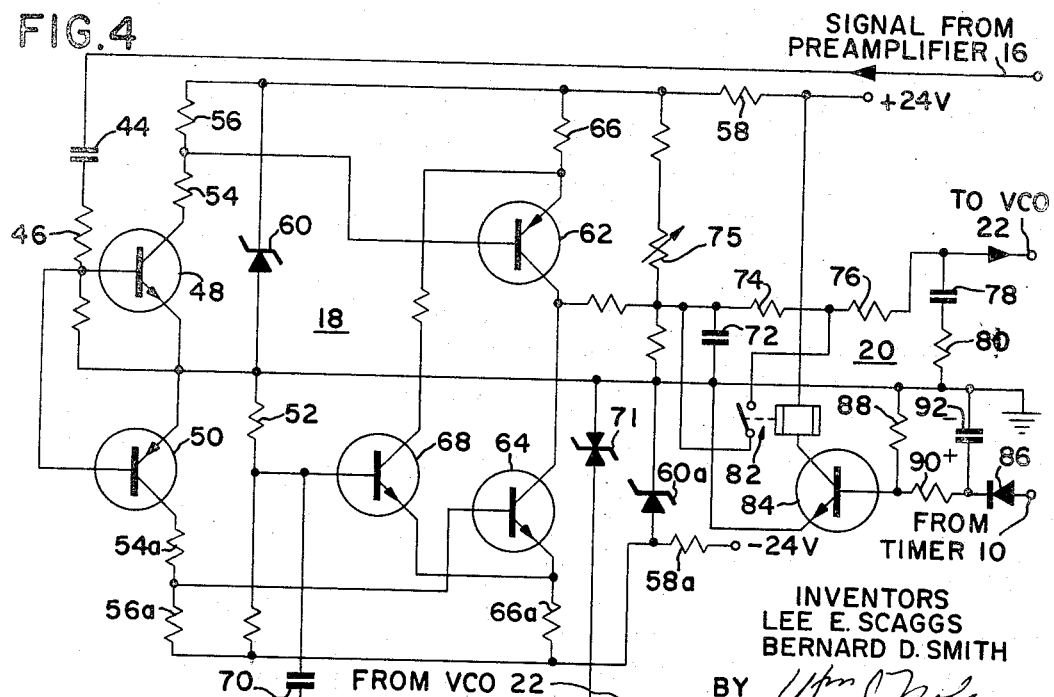
INVENTORS
LEE E. SCAGGS
BERNARD D. SMITH
BY *Wm. J. Nolan*
ATTORNEY April 2, 1968   L. E. SCAGGS ETAL   3,376,500
DIRECT READING MAGNETIC FIELD INTENSITY INDICATING APPARATUS
Original Filed Dec. 5, 1963   3 Sheets-Sheet 2

INVENTORS
LEE E. SCAGGS
BERNARD D. SMITH
BY *Wm. J. Nolan*
ATTORNEY

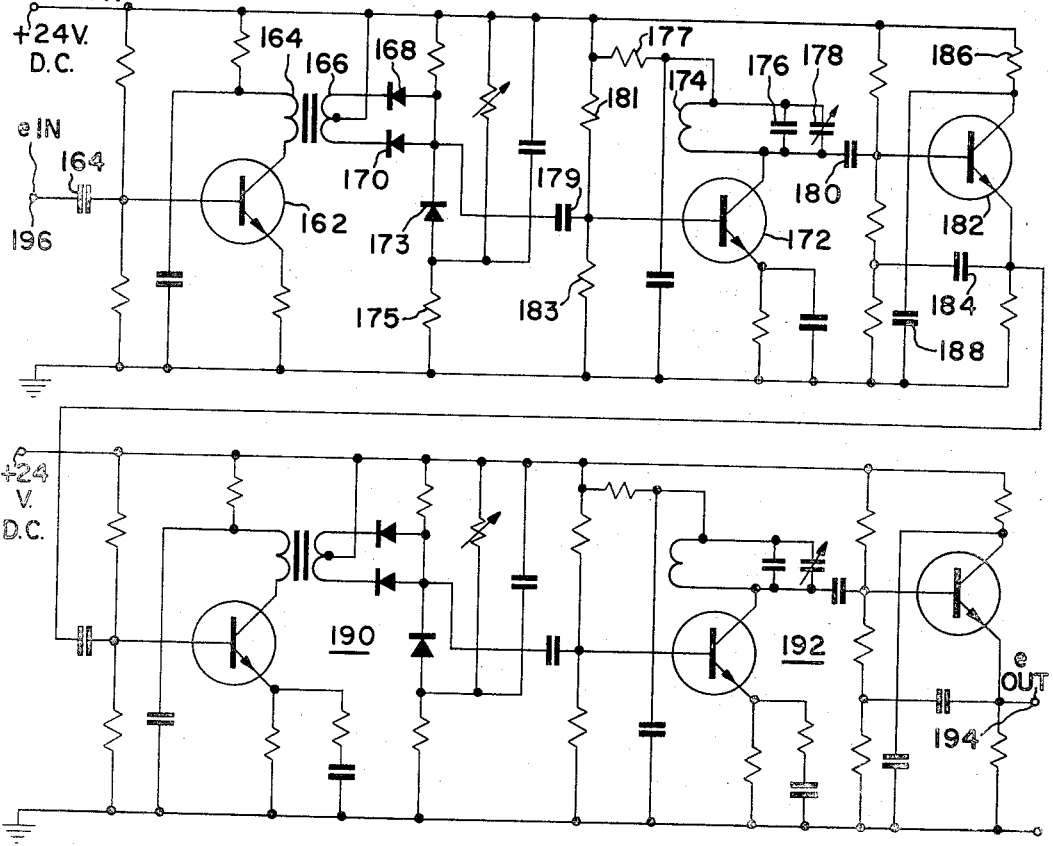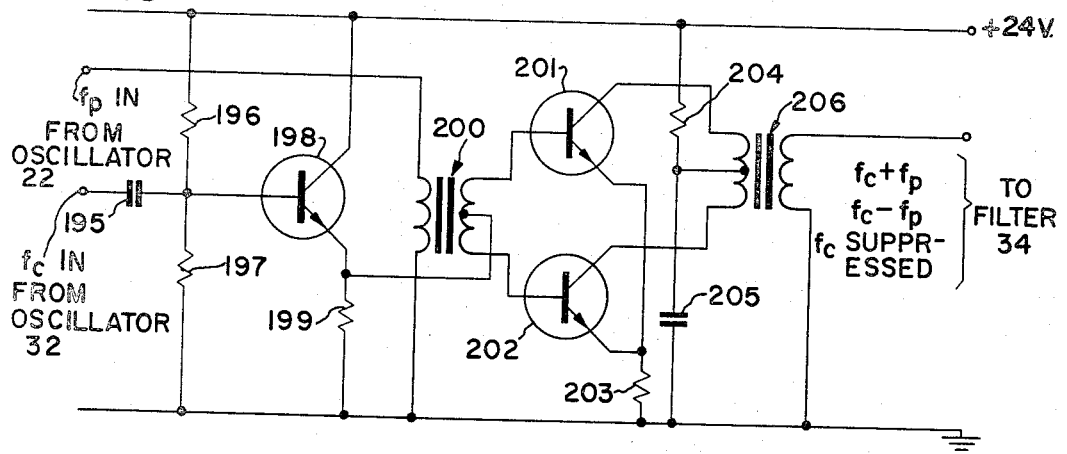

United States Patent Office 3,376,500
Patented Apr. 2, 1968

3,376,500
DIRECT READING MAGNETIC FIELD INTENSITY INDICATING APPARATUS
Lee E. Scaggs and Bernard D. Smith, San Jose, Calif., assignors to Varian Associates, Palo Alto, Calif., a corporation of California
Continuation of application Ser. No. 328,358, Dec. 5, 1963. This application Apr. 25, 1966, Ser. No. 544,911
6 Claims. (Cl. 324—.5)

This is a continuation of application Ser. No. 328,358 filed Dec. 5, 1963, now abandoned.

This invention relates to magnetic field measuring apparatus, and particularly to precession type magnetometers that afford a direct readout of magnetic field intensity.

The technique of measuring magnetic field strengths by means of the precession of atom portions possessing the properties of magnetic moment and gyroscopic moment, such as nuclei, is described in U.S. Patent Re. 23,769, issued to Russell H. Varian on Jan. 12, 1954, entitled, "Method and Means for Correlating Nuclear Properties of Atoms and Magnetic Fields." In a nuclear free precession magnetometer, the nuclei utilized are portons in a sample of water or kerosene, for example. The sensing device which includes the sample is placed in the magnetic field which one desires to measure, for example, the earth's magnetic field, and a strong polarizing magnetic field $H_0$ is applied to the protons by means of a coil surrounding the sample material to polarize the proton magnetic moments $M_0$ substantially at right angles to the earth's magnetic field. This polarizing magnetic field is applied sufficiently long to align the nuclear magnetic moments, for example, three seconds, and is suddenly turned off with the result that the nuclear magnetic moments are left substantially perpendicular, or at least at some substantial angle relative to the direction of the earth's magnetic field, and are free to precess about the direction of the earth's magnetic field at the Larmor frequency of the nuclei. The frequency of such precession is directly proportional to the strength of the magnetic field being measured.

In order to derive the intensity of the magnetic field with such a magnetometer, it is merely necessary to measure the precession signal accurately since $H=kf$, where $H$=earth's magnetic field in gammas ($10^{-5}$ oersted), $k$=23.4874 (proton gyromagnetic ratio) and $f$=frequency of precession in cycles per second. From the expression $H=23.4874f$, it can be seen that each cycle of the precession signal frequency is equal to 23.4874 gamma. Therefore, in order to measure the earth's magnetic field to an accuracy of 1 gamma or less, it is necessary to employ a counter which will measure the precession frequency to fractional parts of one cycle. This has been accomplished in the past by using a counter which is governed by the following expression:

$$N = \frac{f_s n}{f}$$

where N is the displayed number, $f_s$ is the reference frequency of the counter, $f$ is the precession frequency and $n$ is the preset number of cycles of the precession frequency to be counted. This number $n$ is limited by the decay period of the precession signal. By examining the expression $$N = \frac{f_s n}{f}$$

it can be seen that the displayed number N cannot be made to read the magnetic field directly in gammas because N is inversely proportional to $f$, whereas the magnetic field is directly proportional to $f$. In order to obtain the magnetic field in gammas, the following computation must be made for each number (N) displayed on this type of counter:

$$H = \frac{23.4874 f_s n}{N}$$

This conversion process requires an excessive amount of calculating by a trained individual, or expensive computer time. If a computer is used, more complex circuitry is required to code the N information properly so that the computer can handle it.

In U.S. Patent 3,070,745, there is described one form of proton precession magnetometer which utilizes a voltage controlled oscillator that idles at a multiple of the input signal or precession frequency. The voltage controlled oscillator is of the relaxation type and generates a sine wave pulse signal having a time constant determined by the resistive and capacitive (RC) network associated therewith. The patented magnetometer requires a stabilizing network and a properly designed filter to eliminate harmonics and transients that appear during signal processing, especially during the frequency multiplication process. It would be desirable to employ a simple and relatively inexpensive readout system in a proton precession magnetometer.

An object of this invention is to provide a novel and improved magnetometer apparatus.

Another object of this invention is to provide a magnetometer that affords a direct readout of magnetic field intensity with simple and relatively inexpensive circuitry.

Another object is to provide a magnetometer which realizes a direct signal readout with an improved signal-to-noise ratio and with a minimum of transients.

According to this invention, the readout circuit of a magnetometer apparatus comprises a frequency multiplier circuit which is coupled to the output circuit of a stabilized voltage controlled oscillator. The oscillator is locked to an incoming precession signal which is proportional to the intensity of the magnetic field being measured, and the output signal of the voltage controlled oscillator is fed to the frequency multiplier to obtain a signal which is an exact multiple of the precession frequency. The frequency multiplied signal is applied to a digital counter during a predetermined readout interval for conversion to magnetic field intensity. A delay circuit is incorporated in the magnetometer apparatus for gating on the digital counter during such readout interval, whereby transient signals do not appear in the readout signal. By means of this combination, a direct readout of magnetic field intensity is made possible in a simple and inexpensive manner, with a minimum of transients and a relatively high signal-to-noise ratio.

In an embodiment of this invention, the frequency multiplier comprises a carrier signal generator that supplies a carrier signal to a first signal channel and simultaneously to a second channel wherein the signal is mixed with the output signal from the voltage controlled oscillator. The mixed signal and the carrier signal are multiplied in their respective channels, and the multiplied signals are fed to a mixer that produces a difference signal. This difference signal, which is an exact multiple of the precession frequency, is converted by the digital counter to a direct reading of magnetic field intensity.

The invention will be described in greater detail with reference to the accompanying drawings in which:

FIG. 1 is a block diagram of the inventive readout system of a magnetometer;

FIGS. 2a–b are illustrative wareforms to aid in the explanation of the invention;

FIG. 3 is a block diagram of the frequency multiplier used in the apparatus of FIG. 1;

FIG. 4 is a schematic circuit diagram of the phase detector and filter used in the apparatus of FIG. 1;

FIG. 6 is a schematic diagram of the balanced mixer used in the apparatus depicted in FIG. 3;

FIG. 7 is a schematic circuit diagram of the frequency multipliers used in the apparatus depicted in FIG. 3; and, FIG. 8 is a schematic circuit diagram of the diode mixer employed in the multiplier of FIG. 3.

Figure 2:
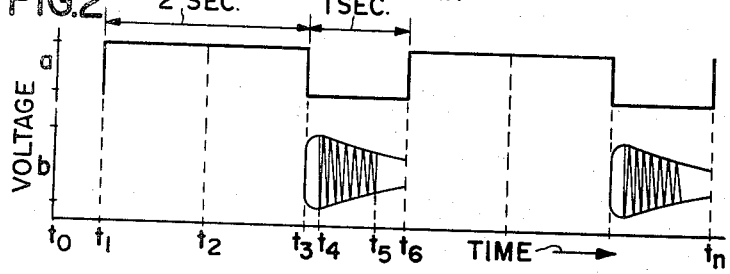

With reference to FIGS. 1 and 2, an embodiment of a readout circuit of a magnetometer apparatus in accordance with this invention comprises a sensing device 10 that includes a sample of water that is sealed in a container which has a coil of wire axially wound about it, such as described in U.S. Patent 3,004,211. Typically, the coil is constructed so as to carry a D.C. current of about 6 amps. and produce a polarizing magnetic field of about 100 gauss within the coil. A sequencer 12 automatically operates to pulse a relay (not shown) which, in its operation position, couples the coil of the sensing device 10 to a power supply 14, and, in its released position, couples the sensing device 10 to the preamplifier 16 and the free precession counter system. The sequencer 12 typically operates to couple the sensing device 10 to the power supply 14 for approximately 2 seconds and then to the counter system for approximately 1 second. During the period of time when the sensing device 10 is connected to the power supply 14, a polarizing magnetic field is produced in the coil of the device 10 to align the magnetic moments of the protons in the water in the direction of the polarizing magnetic field, which is at a substantial angle to the direction of the field to be measured, preferably normal thereto. On disconnect of the sensing device 10 from the power supply 14, the polarizing field quickly decays and leaves the aligned magnetic moments to precess in the earth's magnetic field. The precession magnetic moment induces an alternating current in the sensing device 10, this alternating frequency signal being transmitted to the amplifier 16 under the control of the sequencer 12. A detailed description of the technique of measuring magnetic fields by means of precession of atom nuclei or protons is found in U.S. Patents Re. 23,769, 3,004,211 and 3,090,002, among others.

The precession signal derived from the sensing device 10 is passed through the preamplifier 16, and the amplified signal is fed to a phase detector 18 coupled in a feedback loop that includes a lowpass filter 20 and a voltage controlled oscillator 22. The voltage controlled oscillator 22 generates a sine wave signal and idles at a predetermined frequency, which may be near an anticipated signal frequency in the range of 1000–3125 cycles per second for the earth's field at or near sea level. The phase detector 18 compares the nominal frequency of the oscillator 22 to the incoming signal frequency and provides an error signal which is passed through the filter 20 to the oscillator 22, thereby locking the oscillator 22 to the frequency of the incoming signal. The phase of the oscillator output signal is stabilized to within 3 degrees of the phase of the incoming signal derived from the sensing device 10. The lowpass filter 20 may be time variable or step variable after delay, to facilitate fast lock of the oscillator 22 to the precession frequency $f_p$. The filter 20 is controlled by the sequencer 12 as described hereinafter with reference to FIG. 4. With the oscillator 22 locked to the incoming signal, which represents a measure of the earth's magnetic field, the stable sine wave output from the oscillator 22 is fed to a frequency multiplier 24. The multiplier 24 provides a difference signal which is an exact multiple of the voltage controlled oscillator 22 frequency. A digital counter 26 converts the difference signal to a direct reading of magnetic field intensity.

In operation, the duty cycle of the sensing device 10 is for a predetermined interval $(t_1-t_6)$, three seconds, by way of example, whereby the polarization signal is applied for a portion of such interval $(t_1-t_3)$, such as 2 seconds, and is then cut off for the remaining time $(t_3-t_6)$, one second, as illustrated in FIG. 2. During the cutoff period $(t_3-t_6)$, a readout signal is obtained from the voltage controlled oscillator 22. At the start of the interval $(t_3-t_6)$, the counter 26 is inoperative and is actuated after the sequencer 12 triggers a delay circuit 28, which in turn energizes the gate of the counter 26 at $t_4$ after a delay of about 200 milliseconds. At the instant, $t_4$, the counter 26 begins to count for a predetermined readout interval $t_4-t_5$, the frequency signal from the multiplier 24 is counted, and the number displayed is the magnetic field intensity in gammas.

The frequency multiplier 24 of FIG. 1 is illustrated in FIG. 3, wherein the output signal from the voltage controlled oscillator 22 is applied to a balanced mixer 30 concurrently with a carrier signal from an oscillator 32. The upper sideband of the mixed signal, which may be designated as $f_c+f_p$, ($f_c$ being the carrier signal frequency and $f_p$ the precession signal frequency) is passed through a filter 34, while the lower sideband $f_c-f_p$ is rejected. In a particular embodiment, $f_c$ may be 20 kc. per second, whereas $f_p$ is in the range of 1000–3125 cycles per second for the earth's field. The upper sideband signal is multiplied by a multiplier 36 by an integral number N to produce a signal having a frequency $N(f_c+f_p)$. At the same time, the carrier signal is multiplied by a similar multiplier 38 to obtain a signal of frequency $Nf_c$, and both multiplied signals are fed to a diode mixer 40. The mixed signal is directed to a filter 42 that passes only the difference signal between $N(f_c+f_p)$ and $Nf_c$, which is $Nf_p$, an integral multiple of the precession frequency. This difference signal, which is an exact multiple of the precession frequency, is passed to the counter 26 for direct conversion to a measure of magnetic field intensity.

The phase detector 18 and filter 20 of FIG. 1 are set forth in schematic form in FIG. 4. In operation, the signal from the preamplifier 16 is passed through a coupling capacitor 44 and drop resistor 46 to the bases of a pair of complementary symmetry switching transistors 48 and 50.

The collector circuit of the switching transistors 48 and 50 include load resistors 54, 54a, and bias and load resistors 56, 56a, which are coupled to positive and negative sources of potential respectively through drop resistors 58, 58a. Zener diodes 60, 60a are coupled between the collectors of the transistors 48 and 50 and the drop resistors 58, 58a and serve as voltage regulators.

When the signal from the preamplifier 16 is positive going, the NPN transistor 48 becomes conducting and transistor 50 is cutoff. Conversely, when the signal is negative going, the PNP transistor 50 is conducting and transistor 48 is cutoff. The output signal from the switching transistors 48 and 50 is fed to a pair of transistors 62 and 64 that constitute a phase comparator. The emitters of the transistors 62 and 64 are connected to bias resistors 66, 66a to receive a suitable potential from the voltage sources, shows as +24 v. and −24 v. respectively. An NPN transistor 68 is connected to the emitters of the transistor 62 and 64, the collector of transistor 68 being out of phase with its emitter. The transistor 68 receives a signal from the oscillator 22 through a coupling capacitor 70 and passes such signal to the emitters of the phase detecting transistors 62 and 64. A limiting diode 71 is coupled between the oscillator 22 and ground to square the sine wave generated by the oscillator 22.

If the precession signal from transistors 48 and 50 are phased 90° relative to the signal from the oscillator 22 that appears at the bases of the transistors 62 and 64, then the output of the phase comparator circuit will be zero DC signal. A variable resistor 75 serves to establish the idle center frequency of the voltage controlled oscillator. If there is a phase error, then transistor 62 will conduct for a greater time than transistor 64, which will give a resultant DC error signal. This error signal will provide the necessary correction to the oscillator 22 to lock the oscillator in phase with the precession signal.

A lowpass RC filter network 20 with a variable cut-off frequency is coupled to the output of the phase comparator, or more specifically to the collector circuit of the transistors 62 and 64. The filter comprises a capacitor 72, resistors 74 and 76, capacitor 78 and resistor 80. The filter network also incorporates an automatic switch relay 82 having a time constant determined by the conduction of a driver transistor 84, which in turn is controlled by the sequencer or polarizer timer (12).

During the polarization interval $t_1-t_3$, the positive pulse is applied to the base of the driver transistor 84 through a diode 86 and through a voltage divider consisting of resistors 88 and 90, which provide an RC time constant in conjunction with a capacitor 92. The diode 86 serves to prevent feedback to the polarization timer (12) from the filter circuit 20.

The duty cycle of the relay is controlled by the square wave polarization signal which charges the capacitor 92, and causes the transistor 84 to conduct thereby energizing relay 82. When the polarization signal is removed, the capacitor 92 discharges to ground through the voltage divider resistors 88 and 90, thereby causing the transistor 84 to shutoff and relay 82 to open after a time determined by resistors 88 and 90 and capacitor 92. Thus, when the positive pulse is applied, the driver transistor 84 becomes conducting and causes energization of the relay coil connected to the collector of the transistor 84 causing the relay switch 82 to close. During this time, any DC error signal that appears is passed to the voltage controlled oscillator 22 to rapidly lock the frequency and phase thereof to the precession signal when it appears. When the relay opens at $t_3$+delay, the DC error signal cannot change rapidly because filter 20 has a lower cutoff frequency, but will maintain phase lock between the precession frequency and oscillator frequency, and in effect yields a very high signal-to-noise ratio.

Figure 5:
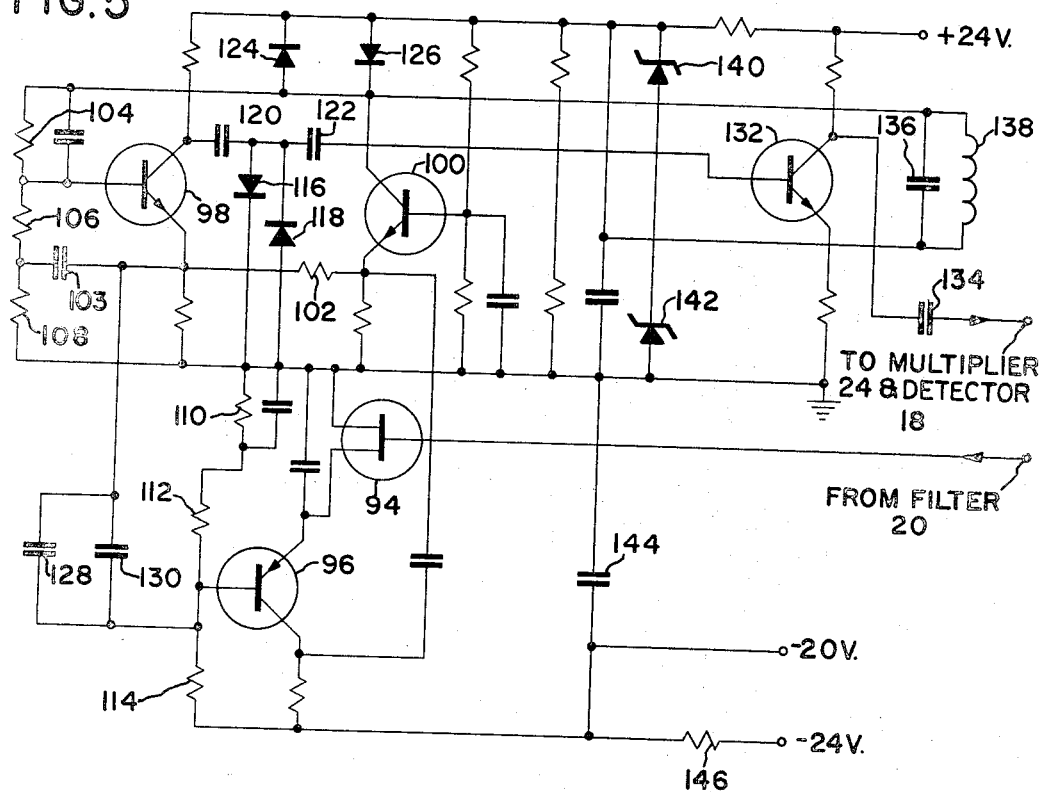
FIG. 5 is a schematic circuit diagram of the voltage controlled oscillator used in the apparatus of FIG. 1.

In FIG. 5, the voltage controlled oscillator 22 comprises a field effect transistor 94 which receives a signal from the filter 20. The field effect transistor 94 serves as a gain control for a PNP transistor 96, which supplies capacitive current to the oscillator transistors 98 and 100.

Transistor 98 is a high impedance emitter follower, whereas, transistor 100 acts as an amplifier. A feedback resistor 102 and capacitor 103 are coupled in the emitter circuit of the transistors 98 and 100 to provide positive feedback and thereby cause an oscillatory signal. Resistors 104, 106 and 108 provide DC bias to the emitter follower transistor 98, whereas resistors 100, 112 and 114 provide bias to the transistor 96. A pair of diodes 116 and 118, located between a pair of coupling capacitors 120 and 122, limit the output signal from the collectors of the transistors 98 and 100, and diodes 124 and 126, similarly limit the amplitude of the oscillatory signal generated by the oscillator.

A quadrature capacitor 128 conupled in parallel with quadrature capacitor 130 provides a high impedance at the carrier frequency thereby effecting a 90° phase shift at the base of the transistor 96. The signal from the collector of transistor 96 causes the capacitive characteristic of the transistor 100 to vary because the collector of the transistor 96 acts like a varying capacitor. The oscillatory signal is amplified by an amplifier transistor 132, which is coupled through a capacitor 134 to the input circuits of the multiplier 24 and detector 18. An LC parallel tuned network comprising a capacitor 136 and inductance 138 is coupled to the oscillator transistors to enable tuning to a predetermined frequency. A pair of Zener diodes 140 and 142 are connected across the source of potential to provide voltage regulation. Also, a capacitor 144 and resistor 146 provide a decoupling network.

In FIG. 6, a balanced mixer such as utilized in FIG. 3 for block 30 is illustrated in schematic form. A first signal of frequency $f_p$, which may be the signal from the voltage controlled oscillator 22, is applied to the primary of transformer 200, while a second signal of frequency $f_c$, which may be the carrier signal, is applied through a coupling capacitor 195, to the NPN transistor 198. The output of transistor 198 is fed to the center tap of transformer 200. Thus, $f_p$ is 180° out of phase at the base of transistor 201 with $f_p$ at the base of transistor 202; and $f_c$ is in phase at the base of transistor 201 with $f_c$ at the base of transistor 202. The signals $f_c$ and $f_p$ are mixed by transistors 201 and 202, and the upper and lower sidebands appear at the output of transformer 206 as $f_c+f_p$ and $f_c-f_p$. However, $f_c$ is cancelled by the transformer 206 and is therefore suppressed at the output of transformer 206. The output of transformer 206 is applied to the filter 34, which rejects the lower sideband $(f_c-f_p)$ and any $f_c$ which may still be present, but passes $f_c+f_p$.

In FIG. 7, a multiplier which provides a frequency multiplication of 24 by way of example, such as utilized in blocks 36 and 38 of FIG. 3 is represented. The signal $(f)$ to be multiplied is provided to an amplifier 162 through a coupling capacitor 164, and is passed through a transformer 164 having a center tapped secondary 166. The signal is passed through a full wave rectifier consisting of diodes 168 and 170, which affords a multiplication of twice the frequency $(2f)$. A rectifier diode 173 and resistor 175 connected in series with the diodes 168 and 170 pass only the sharp spikes of the rectified wave signal to the next multiplier stage. A second multiplication stage including a class C amplifier 172 has its output coupled to a multiplier circuit which enables a frequency multiplication of 3, thus producing a total multiplication of $6f$. A resistor 177 and capacitor 179 serve as a decoupling network for the transistor 172, while resistors 181 and 183 provide dc dias to the transistor. The multiplier circuit includes an inductive element 174, and a capacitor 176 shunted by a variable capacitor 178. The capacitors 176 and 178 serve as tuning capacitors for the inductance 174. A frequency multiplication of three is achieved by adjusting variable capacitor 178 to tune the multiplier circuit to the third harmonic of the signal at the collector of transistor 172. The multiplied signal $(6f)$ is passed through a coupling capacitor 180 to an emitter follower stage 182, which includes a feedback capacitor 184 that raises the input impedance of the transistor 182. A resistor 186 that raises the input impedance of the transistor 182. A resistor 186 and capacitor 188 serves as a decoupling network for the collector circuit of transistor 182.

The signal is taken from the emitter of the transistor 182 and passed through stages 190 and 192, similar to the stages including transistors 162 and 172 respectively. Each stage 190 and 192 produces a frequency multiplication of two, thereby providing a total multiplication of the input frequency $(f)$ to $24f$. The stage 192 is adjusted to achieve a frequency multiplication of two by setting its variable capacitor to tune its multiplier circuit to the second harmonic of the signal at the collector of its transistor. The multiplied output signal appears as a sine wave signal having negligible harmonics and no transients or spurious oscillations.

Figure 8:
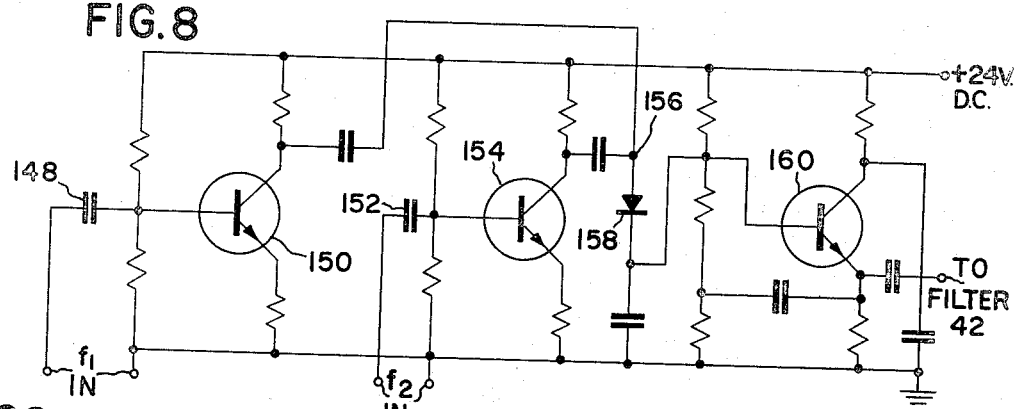

In FIG. 8, a mixer such as utilized in FIG. 3 for block 40 is illustrated in schematic form. A first signal $f_1$ of frequency $24(f_c+f_p)$ from multiplied 36 is applied through a coupling capacitor 148 to the NPN transistor 150, while a second signal $f_2$ of the frequency $24f_c$ from the multiplier 38 is applied through coupling capacitor 152 to the NPN transistor 154. An output is derived from the collectors of each transistor and summed at a junction point 156. The signals are then mixed by diode 158. The mixed signal is passed to the base of an emitter follower transistor 160 which provides the mixed signal to the filter 42.

The mixed signal consists of $24f_c$, $24(f_c+f_p)$, $24(f_c+f_p)$ $-24f_p$, and $24(f_c+f_p)+24f_c$. Filter 42 rejects all frequency except the difference frequency $24(f_c+f_p)-24f_c$. This difference frequency when reduced to its simplest form equals $24f_p$, or 24 times the precession frequency.

The difference between the multiplied signals derived from the multipliers 36 and 38, this difference signal being an exact multiple of the precession frequency, is utilized by the digital counter 26 for obtaining a direct reading in gammas of the magnetic field intensity being measured. The counter 26 may be a commercial Hewlett-Packard Model 5512A with the crystal adjusted for the frequency which will yield a direct readout in gammas.

It is known that $H=kf_p$, where H is magnetic field in gammas, $k$ is the proton gyromagnetic ratio which is known to be 23.4874. Therefore $f_p$ for the earth's field at sea level ranges from 1000–3125 cycles per second. If the commercial counter mentioned in the above paragraph is governed by the expression $$N=\frac{f_n}{f_s}$$

where $N$ is the displayed number, $f$ is the frequency to be counted, $f_s$ is reference crystal oscillator frequency and $n$ is the preset number of reference oscillator cycles to be counted, then it can be shown that a direct reading of magnetic field in gammas will be displayed by proper setting of the reference crystal oscillator frequency $f_s$.

There has been described herein a readout system for a precession magnetometer wherein a precession frequency signal is multiplied by a fixed tuned circuit, such multiplication being achieved over a relatively large frequency range without the necessity of changing multiplier or switching channels. A direct reading of magnetic field intensity may be achieved in gammas with an accuracy of ±1 gamma. Improved accuracy can be achieved by multiplying the precession frequency by a number greater than 24 and by using a more accurate counter.

We claim:
1. A readout circuit for a proton precession magnetometer comprising: means for sensing a proton precession signal; an oscillator for generating a signal having a predetermined center frequency in the vicinity of the frequency of the precession signal coupled to the output of said sensing means; a phase detector for comparing the frequency and phase of such precession and oscillator signals; means for locking the frequency and phase of the oscillator signal to that of the precession signal; a frequency multiplier coupled to the output of said oscillator for multiplying the oscillator signal; a counter coupled to said frequency multiplier for converting the multiplied frequency signal directly to a reading of magnetic field intensity; and, a sequencer for controlling the duty cycle of such sensing means and such counter.

2. A readout circuit for a proton precession magnetometer comprising: means for sensing a proton precession signal; a voltage controlled oscillator for generating a signal having a predetermined center frequency in the vicinity of the frequency of the precession signal coupled to the output of said sensing means; a phase detector for comparing the frequency and phase of such precession and oscillator signals; a feedback loop coupled between said oscillator and phase detector to lock the frequency and phase of the oscillator signal to that of the precession signal; a frequency multiplier coupled to the output of said oscillator for multiplying the oscillator signal; a digital counter coupled to said frequency multiplier for converting the multiplied frequency signal directly to a reading of magnetic field intensity; a sequencer for controlling the duty cycle of such sensing means and such counter; and, a delay circuit coupled between said sequencer and counter for controlling the start time of said counter.

3. A readout circuit for a proton precession magnetometer as in claim 2, wherein said multiplier has 2 signal channels, including a carrier oscillator for supplying a carrier frequency signal to both channels; means for mixing the output signal from said voltage controlled oscillator with said carrier signal in one channel; first and second means for multiplying such mixed signal and such carrier signal separately in each channel; means for mixing the multiplied signals to derive a difference signal; and, means for filtering the difference signal.

4. A readout circuit for a proton precession magnetometer comprising: means for obtaining a proton precession signal; a voltage controlled oscillator for generating a signal at the frequency of the precession signal coupled to said precession signal obtaining means; means for locking the frequency and phase of said voltage controlled oscillator to that of the precession signal; frequency multiplying means coupled to said voltage controlled oscillator for multiplying the frequency of said oscillator and means coupled to said frequency multiplying means for displaying magnetic field intensity information.

5. A readout circuit according to claim 4 wherein said frequency multiplying means includes a first mixer and a first multiplier, a carrier oscillator coupled to said first mixer and said first multiplier, a first filter coupled to said first mixer, a second mixer coupled to said first multiplier, a second multiplier coupled to said first filter and said second mixer and a second filter coupled to said second mixer.

6. A readout circuit according to claim 5 wherein said first and second multipliers comprise fixed tuned circuits.

References Cited
UNITED STATES PATENTS

| | | | |
|---|---|---|---|
| 2,738,462 | 3/1956 | Truxel | 324—79 |
| 3,058,053 | 10/1962 | Bloom | 324—0.5 |
| 3,066,252 | 11/1962 | Drake | 324—0.5 |
| 3,070,745 | 12/1962 | Serson | 324—0.5 |
| 3,090,002 | 5/1963 | Allen | 324—0.5 |
| 3,098,197 | 7/1963 | Barringer | 324—0.5 |
| 3,103,622 | 9/1963 | Millership | 324—0.5 |
| 3,204,178 | 8/1965 | Brown | 324—0.5 |

RUDOLPH V. ROLINEC, *Primary Examiner.*

M. J. LYNCH, *Assistant Examiner.*